United States Patent Office 3,100,181
Patented Aug. 6, 1963

3,100,181
PREPARATION OF ORGANOBORANES
John W. Ryznar, La Grange, and John G. Premo, Western Springs, Ill., assignors to Nalco Chemical Company, Chicago, Ill., a corporation of Delaware
No Drawing. Filed Feb. 16, 1961, Ser. No. 89,882
4 Claims. (Cl. 204—59)

This invention relates to the preparation of organoboranes.

In 1859 the first trialkyl boranes were prepared by the reaction of a dialkyl zinc compound with an alkyl ester of boric acid. The equation representing this synthetic route for the synthesis of trialkyl boranes is presented below:

Equation I $$3ZnR'_2 + 2B(OR'')_3 \rightarrow 2BrR''_3 + 3Zn(OR')_2$$

This method has been discarded as a practical route for trialkyl boranes since it results in rather poor yields and necessitates the use of borate esters which are sometimes not readily available.

Another synthetic route which has been used for the preparation of organoboranes is the reaction of a borate ester with a Grignard reagent. This reaction is presented below as Equation II.

Equation II $$3R'MgX + B(OR'')_3 \rightarrow BrR'_3 + \tfrac{3}{2}MgX + \tfrac{3}{2}Mg(OR'')_2$$

While the Grignard route to the synthesis of organoboranes allows the preparation of a variety of both alkyl and aryl boranes, nevertheless, it is not entirely satisfactory since the reaction in many cases is sluggish.

A more recent synthetic route to the preparation of organoboranes resides in the use of trialkyl aluminum compounds reacted with a boron halide such as boron trifluoride. This reaction proceeds in accordance with Equation III.

Equation III $$3R_3Al + BF_3 \rightarrow 3BR_3 + AlF_3$$

While this route is fairly satisfactory for producing trialkyl boranes it is not too useful for preparing triaryl boranes. Other methods have been suggested for preparing organoboranes but by and large they are subject to several deficiencies of the types noted above.

An interesting synthetic procedure for making organoboranes is reported in detail in the recent work entitled, "Organo Metallic Chemistry," H. Zeiss, Reinhold Publishing Company, 1960. This method consists in reacting olefins with alkali metal borohydrides. The addition of borohydrides to olefins provides a relatively convenient synthesis for many organoboron compounds. The method, while being simple and rapid, is only applicable with starting compounds containing olefinic unsaturation.

With the increasing number of synthetic routes available for the preparation of organoboranes their use in various industrial and commercial applications is becoming of increased importance. One of their most useful applications resides in their catalytic activity for either the bulk solution or emulsion polymerization of certain vinyl monomers. Monomers such as vinyl chloride, vinyl acetate, vinylidine chloride, methyl methacrylate, styrene and acrylonitrile have been catalyzed by trialkyl boranes. When triethylborane and tributylborane are used with oxygen they are effective low temperature catalysts for the formation of stereoregular polymers of the polyvinyl chloride type. When triethylborane is used in the polymerization of vinyl acetate the branch chaining phenomena frequently found in the polymerization of this monomer is substantially eliminated. It is thus evident that the organoboranes, particularly the lower alkyl boranes, are extremely valuable catalytic agents.

One of the objects of the invention is to provide an improved and radically different method for producing organoboranes.

Another object is to provide a route for the synthesis of organoboranes which allows the preparation of a large variety of organoboranes using a single synthetic procedure. Other objects will appear hereinafter.

In accordance with the invention, it has been found that organoboranes may be easily prepared by electrolyzing a Grignard reagent in an organic solvent for the Grignard reagent using a boron anode and an electrically conductive cathode. In this process the free hydrocarbon radicals derived from the Grignard reagent combine with the boron of the anode to form the corresponding organoborane. Simply expressed, the boron anode is sacrificial and is decomposed during the reaction to form the organoborane.

By using this electrolysis technique it is simple to react Grignard reagents of the formula RMgHalide with boron to produce organoboranes corresponding to the notation $R_3B$. In these formulas R is an organic radical which is primarily composed of carbon and hydrogen. In most instances R will be an acyclic hydrocarbon radical containing from 1 to 18 carbon atoms.

The only limitation upon the type of organoborane that may be produced resides in the type of Grignard reagent used in the reaction. For preparing organoboranes by the practices of the invention such easily synthesized Grignard reagents as methyl magnesium chloride, isopropyl magnesium bromide, butyl magnesium chloride, amyl magnesium iodide, phenyl magnesium bromide, ethyl magnesium chloride, octyl magnesium bromide, nonyl magnesium bromide, isobutyl magnesium chloride, and octadecyl magnesium bromide may be used. While any Grignard halides may be used to prepare the organoboranes of the invention, the organo magnesium chlorides seem to give higher yields. A possible explanation for this phenomena is the increase in electrical conductivity of the organo magnesium chloride solutions.

The boron anode may be prepared from either crystalline or amorphous boron. In the well-known Norton process, which is described in U.S. 2,542,916, elemental boron is produced by reacting boron trichloride with hydrogen. The resultant products are elemental boron and hydrochloric acid. In this process a mixture of boron trichloride and hydrogen gas is passed over a series of electrically-heated graphite rods. The boron builds up as a layer on the graphite rods. The crystalline boron produced by this process has a high purity, viz.: usually in excess of 95% by weight. A typical analysis of boron produced by this process is as follows.

| Elements: | Percent by weight |
|---|---|
| Boron | 97.65 |
| Carbon | 1.29 |
| Iron | 0.22 |
| Aluminum | 0.03 |
| Calcium | 0.27 |
| Magnesium | 0.05 |
| Copper | Trace |
| Manganese | Trace |
| Silica | Trace |

Another method that may be used in the preparation of elemental boron is the well-known Czochralski method wherein fine crystals of boron are melted in a boron nitride crucible to produce solid, relatively dense, boron. Similarly boron rods, wires, and other similar shapes may be produced by using the well-known hot wire techniques which are described in detail in the publication, "Boron Synthesis, Structure, and Properties," by Kohn et al., Plenum Press, Inc., 1960.

Another method has been described which is admirably suited for producing boron electrodes capable of being used in the practices of the invention. This method is the subject of Schlesinger et al. 2,528,454. This patent shows that a variety of substrates may be coated with elemental crystalline boron by the use of elevated temperatures e.g., 300–500° C., with the boron source being a boron hydride such as, for example, diborane, dihydro tetraborane or pentaborane.

Using the conditions and techniques described in this patent, it is possible to coat a variety of substrates such as metal cylinders, ceramic objects and the like with the only particular limitation being that the best substrates should desirably be capable of forming a boride. Thus, for example, such metals as iron, nickel, aluminum, or copper may be boron coated. The shape of the article coated may be either in the form of cylinders, rods, sheets, plates or tubes.

For the purposes of this invention it is desirable that the substrate used be electrically conductive and will not react with the Grignard reagent. A suitable substrate is tantalum, tungsten or columbium. These metals are readily coated by the practices of Schlesinger U.S. 2,528,454 yet they do not tend to enter into the electrolysis reaction.

Since elemental boron has a relatively high specific resistance e.g., 775,000 ohms at 27° C., it is beneficial that the boron electrode have the largest possible surface area in the electrolysis cell. In addition to presenting a relatively large surface area, it is also beneficial that the boron electrode be as thin as possible to further minimize voltage drops. By using the practices of Schlesinger et al. U.S. 2,528,454, it is possible to coat a thin tantalum sheet with a boron coating of at least several mils in thickness. If a lead in wire is affixed to the tantalum sheet prior to the coating operation it is possible to then connect the base tantalum sheet to a suitable source of positive direct current. The Schlesinger et al. coating of boron on the tantalum sheet is dense and substantially non-porous, while at the same time being a crystalline form of boron. Such a film is not affected or permeated by the solution of the Grignard reagent and to that extent it may be employed in the electrolysis process with a minimum amount of voltage being required to produce the necessary current for the electrolysis reaction.

The cathode may be constructed of any electrically conductive material such as, for example, iron or platinum although in a preferred embodiment of the invention the cathode will also be an electrically conductive substrate which has been uniformly coated with boron.

During the electrolysis reaction, the anode sacrifices boron to the Grignard reagent thereby forming the organoborane compound. As the boron is gradually eroded due to the electrochemical processes involved and the electrically conductive substrate of the anode is exposed, a voltage change occurs when the boron film is penetrated. When this happens and a boron coated type cathode is employed it is possible to reverse the current of the system making the former anode the cathode and the cathode the anode thereby allowing a continuation of the process.

While it is desirable to use a boron-coated conductor, it is also possible to use either fine particle size amorphous or crystalline metallic boron particles if they are placed into a suitable conductive container and electrically separated from the cathode. When this type of arrangement is employed it is, of course, necessary to use relatively high voltages e.g., usually in excess of 500 volts, to produce operating current densities which in most cases must be approximately at least 100 milliamperes.

The solvent used for the Grignard regent must be relatively inert under the conditions of the process. The solvents used are organic liquids which have dielectric properties, but which have sufficient conductivity to permit passage of the current between the anode and the cathode. When the process is operated using solvents such as diethylether and tetrahydrofuran, many of the organoboranes are soluble therein. Other typical solvents which may be used for conducting the reaction are such compounds as dimethyl ether, di-isopropyl ether, and homologs thereof including the well-known polyoxyalkylene diethers and polyethers e.g., the dimethyl ether of diethylene glycol. As can be seen from this representative list of solvents, ethers are preferred, particularly those ethers which contain at least four carbon atoms or more, although the number of carbon atoms should not generally exceed more than eight.

Illustrative of the organoboranes that are capable of being prepared by the practices of the invention are such well-known organoboranes as trimethylborane, triethylborane, tri-n-propylborane, triisopropylborane, tri-n-butylborane, triisobutylborane, tri-n-hexylborane, trivinylborane, triphenylborane, tri-2,5-dimethylphenylborane and tribetanaphthyl borane.

It is obvious that the organic substituent of the Grignard reagent determines the particular organoborane material to be produced. Thus the general reaction occurring during electrolysis may be expressed as follows:

Equation IV

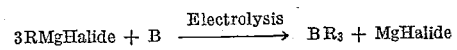

$$3\text{RMgHalide} + B \xrightarrow{\text{Electrolysis}} BR_3 + \text{MgHalide}$$

In a typical laboratory experiment to produce triethylborane, an electrolysis cell would be set up utilizing as the anode the boron coated tantalum sheet produced in accordance with Schlesinger et al. U.S. 2,528,454. The cathode of the cell would be composed of platinum or stainless steel. Into the cell would be added diethyl ether and ethyl magnesium chloride.

After the reagents had been carefuly mixed in the cell they would be nitrogen blanketed, the current would be applied, and sufficient voltage impressed until the current density was in excess of 100 milliamperes. To prevent overheating and volatilization of the reaction components, the Grignard solution may be withdrawn from the cell periodically and recirculated through cooling equipment to maintain the temperature below the boiling point of the ingredients used and the triethyl borane.

The current would be applied for a period of time sufficient to sacrificially remove the boron from the tantalum coated electrode, e.g., about 8 hours. After the electrolysis is completed, it is possible to separate the triethylborane from the diethyl ether by distillation. After the diethyl ether is removed from the triethyl borane the temperature may be elevated to 95° C., where the triethyl borane is readily recoverable, thereby separating it from the magnesium chloride and any other reaction products. Since the lower organoboranes such as triethyl and trimethylborane are sensitive to oxygen and tend to spontaneously ignite upon contact with air, it is desirable that all the reactions be conducted in the presence of an inert atmosphere, such as nitrogen.

The electrolysis reactions described above proceed smoothly and rapidly. The sluggishness experienced by using Grignard reagents in the prior art preparations of organoboranes is for the most part eliminated.

An important advantage of the invention is that it allows the simple preparation of mixed organoboranes. This is accomplished by using mixed Grignard reagents. When this technique is employed, fractional distillation is necessary to separate the mixtures of products formed.

Having thus described my invention in all its useful and novel aspects, it is claimed as follows.

We claim:

1. A process for preparing organoboranes which comprises electrolyzing between a boron anode and a cathode, a substantially anhydrous solution of a Grignard reagent of the formula RMgHalide in a substantially inert solvent for the Grignard reagent, and recovering as an electrolysis product an organoborane of the formula $R_3B$ where R is an organic radical containing as its major components the elements, carbon and hydrogen.

2. The process of claim 1 where R is an acyclic hydrocarbon radical of from 1 to 18 carbon atoms in chain length.

3. The process of claim 1 where the boron anode comprises an electrically conductive substrate which is uniformly coated with a dense, substantially non-porous thin film of crystalline boron.

4. The process of claim 1 where the substantially inert solvent for the Grignard reagent is an ether which contains at least four carbon atoms and the RMgHalide is a RMgChloride.

References Cited in the file of this patent

UNITED STATES PATENTS 2,923,740   Stone _____ Feb. 2, 1960

FOREIGN PATENTS 839,172   Great Britain _____ June 29, 1960

OTHER REFERENCES

Jones and Gilman: "Chemical Reviews," vol. 54, October 1954, pages 844–846.